(12) United States Patent
Butcher et al.

(10) Patent No.: US 10,644,907 B1
(45) Date of Patent: May 5, 2020

(54) SYSTEM AND METHOD OF VARIABLE EQUALIZATION FOR CROSSTALK MINIMIZATION

(71) Applicant: DELL PRODUCTS, LP, Round Rock, TX (US)

(72) Inventors: Andrew Butcher, Cedar Park, TX (US); Bhyrav M. Mutnury, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/257,573

(22) Filed: Jan. 25, 2019

(51) Int. Cl.
*H04B 1/04* (2006.01)
*H04L 25/03* (2006.01)
*G06F 13/40* (2006.01)

(52) U.S. Cl.
CPC ........ *H04L 25/03343* (2013.01); *G06F 13/40* (2013.01); *H04B 1/04* (2013.01); *G06F 2213/0026* (2013.01); *H04B 2001/0416* (2013.01)

(58) Field of Classification Search
CPC .. H04B 1/04; H04B 2001/0416; H04B 10/07; H04B 10/0779; H04L 25/03343; G06F 13/40; G06F 2213/0026
See application file for complete search history.

(56) References Cited

U.S. PATENT DOCUMENTS

| | | | |
|---|---|---|---|
| 7,516,226 B2 * | 4/2009 | Ahmed | .................. H04B 10/07 370/236 |
| 7,680,226 B2 | 3/2010 | Murugan et al. | |
| 9,674,013 B2 | 6/2017 | Patel et al. | |
| 2013/0145212 A1* | 6/2013 | Hsu | ...................... G06F 11/2733 714/27 |
| 2018/0089125 A1 | 3/2018 | Berke et al. | |
| 2019/0131974 A1* | 5/2019 | Das Sharma | ........... G06F 3/017 |
| 2019/0163255 A1* | 5/2019 | Dewey | .................. G06F 1/3287 |

OTHER PUBLICATIONS

"Spread-spectrum clocking in PCI Express," Jason Frels, EDN Network, Jan. 12, 2017, pp. 1-3, https://www.edn.com/design/pc-board/4443272/Spread-spectrum-clocking-in-PCI-Express.
"PCIe goes Clockless—Achieving independent spread-spectrum clocking without SSC isolation," Reginald Conley, PLX Technology, EE Times, Jul. 5, 2012, pp. 1-9, https://www.eetimes.com/document.asp?doc_id=1279744.
PCI Express 3.0 Equalization: The Mystery Unsolved, Sanjeev Kumar, CEO and PCIe Expert, ashTbit Technologies, white paper, Fruit Technologies, Aug. 2007, pp. 1-7 https://www.ashtbit.net/applications/lfrunew/resource/PCIe_Equalization_v01.pdf.

* cited by examiner

*Primary Examiner* — David S Huang
(74) *Attorney, Agent, or Firm* — Larson Newman, LLP

(57) ABSTRACT

An information handling system transmitter has a channel management module configured to negotiate and to lock a static transmitter equalization range. Control logic selects a setting adjustment for the locked transmitter equalization range; selects a variation type; applies the selected setting adjustment using the selected variation type, and instructs the transmitter channel management module to re-negotiate the updated transmitter equalization range. A receiver may negotiate and re-negotiate with the transmitter in order to receive the updated transmitter equalization range. The receiver may auto-adapt the updated transmitter equalization range to receive the transmitted data.

20 Claims, 6 Drawing Sheets

US 10,644,907 B1

SYSTEM AND METHOD OF VARIABLE EQUALIZATION FOR CROSSTALK MINIMIZATION

FIELD OF THE DISCLOSURE

This disclosure generally relates to information handling systems, and more particularly relates to variable equalization for crosstalk minimization in a serial channel of an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system includes a transmitter and a receiver. The transmitter may have a channel management module configured to negotiate and to lock a static transmitter equalization range. Control logic may select a setting adjustment for the locked transmitter equalization range; select a variation type; apply the selected setting adjustment using the selected variation type, and instruct the transmitter channel management module to re-negotiate the updated transmitter equalization range. The receiver may negotiate and re-negotiate with the transmitter in order to receive the updated transmitter equalization range. The receiver may auto-adapt the updated transmitter equalization range to receive the transmitted data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
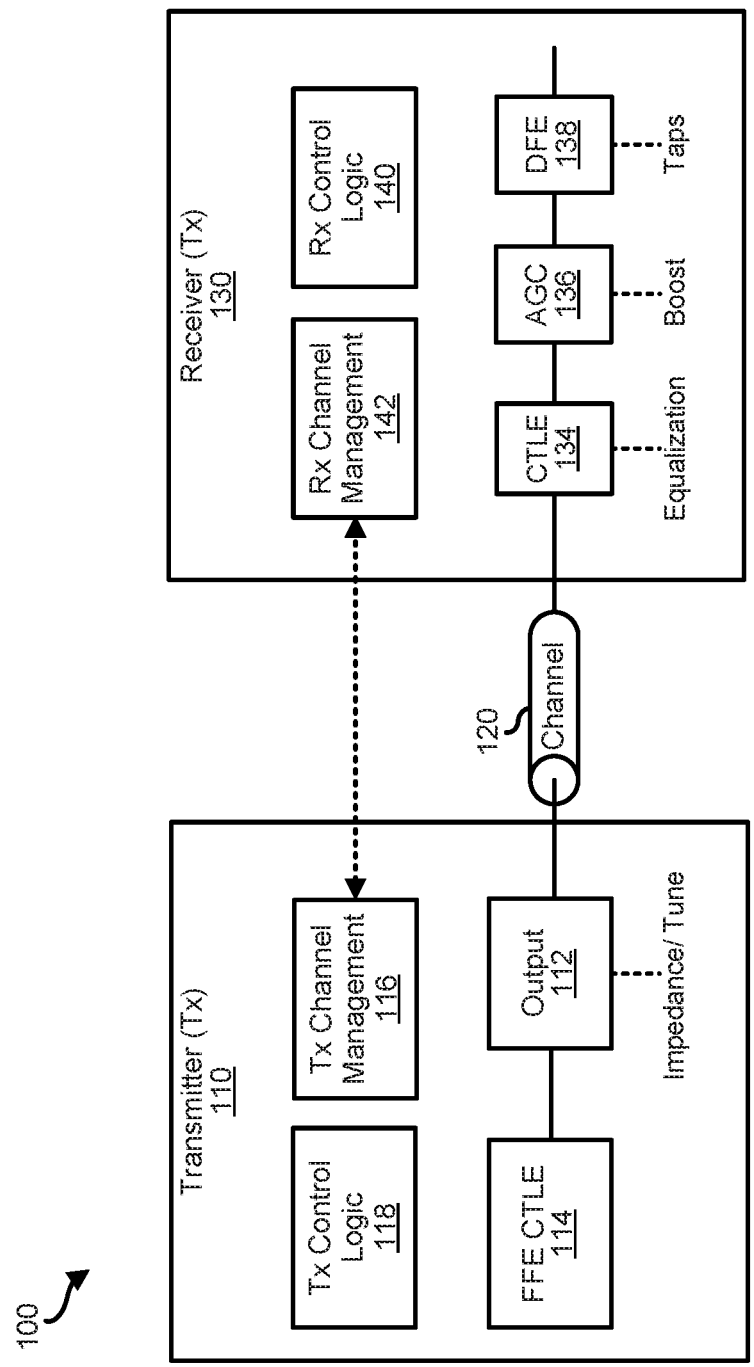
FIG. 1 illustrates a high speed serial interface according to an embodiment of the present disclosure.

FIG. 1 illustrates an embodiment of a high speed serial channel 100 of an information handling system. Serial channel 100 includes a transmitter 110, a transmission channel 120, and a receiver 130. Serial channel 100 represents one half of a bi-directional serial data link for communicating data from transmitter 110 located at a first component to receiver 130 located at a second component. The other half of the bi-directional serial data link is similar to serial channel 100, but with a receiver in the first component, and a transmitter in the second component, for communicating data back from the second component to the first component. Here, the components can be understood to include elements within an information handling system, such as components that are attached to one or more printed circuit board of the information handling system, where transmission channel 120 can represent one or more circuit traces on the printed circuit board, and can include one or more connectors. The components can also be understood to include devices of an information handling system, such as a hard drive, a storage array, a processor, and the like, that are separate from the printed circuit board of the information handling system, where transmission channel 120 can include one or more transmission cables. An example of serial channel 100 includes a peripheral component interconnect (PCI)-Express (PCIe) channel that is in compliance with one or more PCIe specifications, a Serial ATA (SATA) channel that is in compliance with one or more SATA specifications, a SAS channel that is in compliance with one or more SAS specifications, or another high speed serial channel.

Serial channel 100 operates to provide back channel adaptation where transmitter 110 and receiver 130 communicate with each other to optimize and adjust various compensation values within the transmitter and the receiver to compensate for insertion loss, crosstalk, and other signal degradations of transmission channel 120. In a preferred embodiment, the back channel adaptation mechanism may operate to provide dynamic setting adjustments of a transmitter equalization range in each lane or across all lanes of a multiple lane-transmission channel. In this embodiment, the different setting adjustments may be applied randomly, uniformly, or by using Gaussian distribution. In this manner, the compensation value or equalization value at any point in time within a given equalization range of a particular lane may not be aligned to the equalization value at any point in time within an identical or a different equalization range in another lane. In case of alignment between these equalization values, the alignment includes a very short duration and may create a negligible crosstalk amount. As a result, the non-alignment from the varying equalization values may minimize presence of crosstalk in between lanes or in the transmitter channel. At the receiver end, the receiver 130 may correspondingly adapt to non-static setting of the transmitter equalization range by adjusting accordingly the receiver equalization parameters.

Transmitter 110 includes a channel output module 112, a feed-forward equalization (FFE) continuous time linear equalization (CTLE) module 114, a transmitter channel management module 116, and a transmitter control logic 118. Receiver 130 includes a CTLE module 134, an automatic gain control (AGC) module 136, a decision feedback equalization (DFE) module 138, a receiver control logic module 140, and a receiver channel management module 142.

Channel output module 112 includes an impedance/tuning setting. The impedance setting operates to select a target impedance for the output of transmitter 110. For example, the impedance setting can operate to select a 25 ohm output impedance, a 40 ohm output impedance, a 50 ohm output impedance, a 75 ohm output impedance, or another output impedance selected to match an impedance of transmission channel 120, as needed or desired. The tuning setting operates to select a fine tuning of the output impedance of transmitter 110 around the nominal impedance selected by the impedance setting. In a particular embodiment, the tuning setting provides a low impedance adjustment setting, a nominal setting, and a high impedance adjustment setting. In another embodiment, the tuning setting provides more or less than three impedance adjustment settings, as needed or desired. In these embodiments, the channel output module may be configured to adapt dynamic changes or adjustments in the settings of transmitter equalization parameters. Particularly, the channel output module is configured to adapt the randomly, uniformly, etc. distributed setting adjustments that are used during actual data transmissions in the transmitter channel.

Transmitter channel management module 116 and receiver channel management module 142 may represent a separate side-band communication channel for communicating back channel adaptation instructions between transmitter 110 and receiver 130. For example, the communications between transmitter channel management module 116 and receiver channel management module 142 may include a third party device or mechanism that provides system management for an information handling system that includes serial channel 100, such as a Baseboard Management Controller (BMC), an Integrated Dell Remote Access Controller (IDRAC), or another embedded controller, as needed or desired. In another embodiment, management module 116 and channel management module 142 may represent management traffic between transmitter 110 and receiver 130 that is communicated over transmission channel 120 and an additional transmission channel from receiver 130 to transmitter 110.

In an embodiment, the transmitter channel management module may be configured to negotiate with the receiver channel management module in order to receive and to lock an initial and static transmitter equalization parameter. Thereafter, transmitter control logic 118 is configured to process the static transmitter equalization parameter to generate an updated transmitter equalization parameter. With the updated transmitter equalization parameter, the transmitter channel management module re-negotiates or performs another negotiation with receiver channel management module. In response to the re-negotiated transmitter equalization parameter, the receiver control logic 140 may facilitate adjustments in receiver equalization parameter based on the updated transmitter equalization parameter. In an embodiment, the transmitter channel management module 116 exits after each negotiation and the receiver auto-adapts to the latest or updated transmitter equalization parameter.

Transmitter equalization using the FFE CTLE module 114 provides pre-emphasis of high frequency leading edge of bit transitions. In an embodiment, the FFE CTLE module may provide emphasis in its high frequency response. In this embodiment, the FFE CTLE module may be implemented by using delays, gains, and summer components. In a particular embodiment, the FFE CTLE module is a finite impulse response (FIR) filter. For example, input data propagates through a series of FFE CTLE module delay lines where each delay is equal to one bit unit time interval. In this example, each of the sampled signals is multiplied by corresponding FIR tap coefficient, and thereafter the resulting products from the FIR taps are summed up to produce the FFE CTLE module output.

The FFE CTLE module output may be configured to correspond to the dynamic adjustments in the setting of the transmitter equalization parameter such as transmitter equalization range. In this embodiment, FFE CTLE may provide emphasis-equalizations that are not limited to a static equalization range such as a 5 dB equalization range, 4 dB equalization range, and the like. With dynamic setting adjustments that are applied in random, uniform, or by using Gaussian distribution, the time-varying filter frequency responses of the FFE CTLE may generate different amount of equalization values at any point in time within a given equalization range.

For example, the FFE CTLE module provides pre-emphasis on a 4 db-6 db equalization range. The 4 db-6 db equalization range includes, for example, the updated transmitter equalization parameter after a selected +−1 dB setting adjustment is applied to a 5 dB static reference equalization range. In this example, the +−1 dB setting adjustment is applied in random, uniform, or by using Gaussian distribution. In this example still, the pre-emphasis may generate different equalization values at any point in time within the 4 db-6 db equalization range because of time-varying filter frequency responses of the FFE CTLE module. Because the corresponding switching frequencies for the varying equalization values are not static, the performed equalizations may minimize occurrence of crosstalk. In a particular embodiment, the FFE CTLE module may receive control signals from the transmitter control logic module. In this embodiment, the control signals may include instructions to implement the updated equalization ranges or parameters.

Transmitter control logic module 118 includes a hardware circuitry configured to provide the dynamic setting adjustments of the transmitter equalization parameters as described herein. Transmitter control logic module 118 may utilize instructions that are hard coded into transmitter or firmware that may be stored in the transmitter or provided thereto, as needed or desired. In an embodiment, the transmitter control logic module provides instructions to the transmitter channel management to negotiate and to lock the initial equalization parameters. In this embodiment, the transmitter control logic module receives the locked initial equalization parameters, selects a desired setting adjustment, and performs dynamic setting adjustments of the locked initial equalization parameters. The dynamic setting adjustment is applied in random, uniform, or by using Gaussian distribution.

In an embodiment, the negotiated and locked initial equalization parameters may include a particular static reference equalization range, a corresponding operating or switching frequency for the static equalization range, a lane width, a link bandwidth, a transmitter de-emphasis level ratio, and the like. In this embodiment, the dynamic setting adjustments may include varying in random, uniform, or by using Gaussian distribution, the static equalization range, link bandwidth and the like. For example the dynamic setting adjustments may include selecting a pre-set value, such as +−3 dB, that is added and subtracted to the reference static equalization range e.g., 5 dB in order to generate the updated equalization range. In this example, the selected +/−3 dB setting adjustment is applied in random, uniform, or distributed using Gaussian distribution. Furthermore, the updated equalization range may be identical on each lane. In case of different pre-set values that are applied to the static equalization range, each of resulting updated equalization ranges may be applied on each lane of transmission channel. Thereafter, the transmitter control logic module issues another instruction for the transmitter channel management to re-negotiate the updated equalization range. With the receiver auto-adapting the re-negotiated equalization range, the transmitter performs data transmissions through the transmission channel.

In another embodiment, the transmitter control logic module need not perform the initial negotiation or auto-negotiation to lock on the initial transmitter equalization range when the link has been established. Instead, the transmitter control logic module may be configured to directly negotiate the updated equalization ranges. In this embodiment, the receiver is expected to auto-adapt accordingly.

Transmission channel link may include multiple lane widths such as a four-lane (x4) root port, an eight-lane (x8) root port, a single sixteen-lane (x16) root port, a thirty two-lane (x32) root port, or a combination thereof. In an embodiment, the updated equalization parameter such as updated equalization range may be implemented across all lanes of a particular root port. For example, for the x4 root port, an updated equalization range may include a setting adjustment of +−1 dB on a negotiated and locked 5 dB initial static equalization range. In this example, the setting adjustment of +−1 dB is implemented across all four lanes of the x4 root port. That is, each of the lanes 0, 1, 2 and 3 of the x4 root port may include 4 dB to 6 dB—updated equalization range. The 4 dB to 6 dB equalization range is derived from subtracting and adding 1 dB, respectively, to the locked 5 dB static equalization range. Furthermore, the +−1 dB setting adjustment is applied in random, uniform, and the like, in order to generate varying different equalization values within the 4 dB to 6 dB equalization range.

In another embodiment, different setting adjustments may be selected and applied for each lane of the x4 root port in order to generate different spread. In this embodiment, each lane may include a different setting adjustment. For example, for a locked 5 dB initial static equalization range, a +/−1 dB may be selected and applied to lane 0, +/−1.5 db may be selected and applied to lane 1, +/−2 dB may be selected and applied to lane 2, and +/−2.5 db may be selected and applied to lane 3. In this example, each of the lanes 0, 1, 2, and 3 of the x4 root port includes an equalization range of 4 dB-5 dB, 3.5 dB-6.5 dB, 3 dB-7 dB, and 2.5 dB-7.5 dB, respectively. In this example still, the selected setting adjustments are applied in random, uniform, or by using Gaussian distribution. As a result, the different equalization values at any point in time within a given equalization range may decrease presence of crosstalk in the transmission channel.

Receiver 130 receives serial data transmission through the CTLE module 134. In an embodiment, the CTLE module operates to provide compensation for inter-signal interference (ISI) in order to open the signal eye of the received signal. The amount of compensation is determined based upon the adapted updated equalization parameters in the transmitter 110. For example, the updated equalization range is received by the receiver control logic 140 through the receiver channel management module 142. In this example, the receiver control logic may issue instructions to the CTLE module to adapt the updated equalization range. For example, the CTLE module supports 21 CTLE equalization settings where each setting prescribes a different amount of equalization, from 0 dB to 10 dB, in 0.5 dB steps. In this example, the CTLE module may utilize the equalization setting that corresponds to the updated equalization parameters used at the transmitting side. In other examples, different numbers of settings and amounts of equalization may be utilized, as needed or desired.

The equalized signal is provided from CTLE module 134 to AGC module 136. AGC module 136 operates to provide linear gain to the signal received from CTLE module 134 to further open the signal eye of the received signal. The amount of gain is determined by a gain setting, and can support 21 gain settings where each setting prescribes a different amount of gain, for example, from 0 dB to 10 dB, in 0.5 dB steps. Other numbers of settings and amounts of gain prescribed by the gain setting can be utilized, as needed or desired. In an embodiment, AGC 136 operates to provide linear gain in two or more frequency ranges. For example, AGC 136 can include a first gain setting for low frequency gain and a second gain setting for high frequency gain, and each setting can support 21 gain settings which each prescribe a different amount of gain, for example, from 0 dB to 10 dB, in 0.5 dB steps. Other numbers of settings and amounts of gain prescribed by the gain settings can be utilized, as needed or desired.

The amplified signal is provided from AGC module 136 to DFE module 138. DFE module 138 operates to provide feedback based compensation to the received signal. The amount of compensation is determined by enabling a number of circuit feedback taps. For example, DFE module 138 can support up to 16 taps that provide compensation based upon up to 16 previous data points. In a particular embodiment, DFE module 138 can be turned off, thereby reducing the power consumed by receiver 130. In another embodiment, one or more tap of DFE module 138 can be turned on based upon the taps setting, while the rest of the taps are placed into a tri-state condition, that is, with power applied, but with the taps not providing feedback to the resultant DFE compensation. In yet another embodiment, one or more tap of DFE module 138 can be turned on based upon the taps setting, while the rest of the taps are turned off, thereby reducing the power consumed by receiver 130. Other numbers of taps can be utilized, as needed or desired.

In an embodiment, the receiver control logic module 140 may be configured to issue instructions to the CTLE module, AGC, and the DFE, based upon the received updated equalization parameters through the receiver channel management 142. For example, the re-negotiated updated equalization parameter includes a particular equalization range that is applied across all four lanes of the x4 transmission channel. In this example, the receiver control logic module may issue instructions for the CTLE module, AGC, and the DFE to adapt the new equalization parameters when receiving data transmissions across all lanes of the x4 transmission channel. In this manner, the data transmissions are received with minimal crosstalk.

Figure 2:
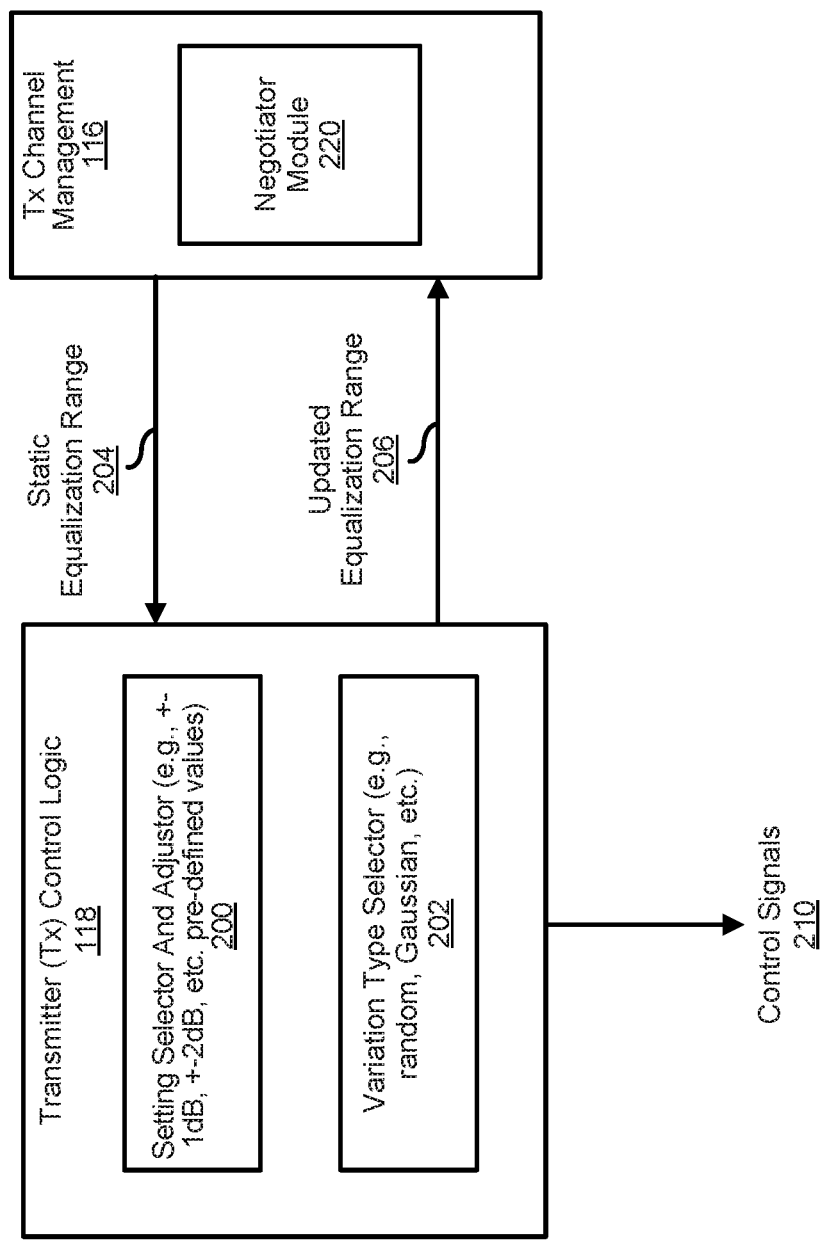
FIG. 2 illustrates a portion of the high speed serial interface that implements variable equalization to minimize crosstalk.

FIG. 2 shows a portion of the serial channel 100 including the transmitter control logic 118 and the transmitter channel management 116. The transmitter control logic 118 includes a setting selector and adjustor module 200, and a variation type selector 202. The transmitter control logic is further configured to receive an auto-negotiated static equalization range 204, to process the received static equalization range in order to generate an updated equalization range 206, and to issue control signals 210 to implement the updated equalization range. The transmitter channel management module 116 includes a negotiator module 220 that is configured to negotiate and/or re-negotiate with the receiver. For example, the initial negotiation facilitates receiving and locking of the static equalization range while the re-negotiation includes communicating the updated equalization range to the receiver.

In an embodiment, transmitter channel management module 116 receives an instruction from the transmitter control logic to negotiate and to lock an initial static transmitter equalization range. Thereafter, the transmitter channel management module sends the static equalization range 204 and waits for another instruction to re-negotiate the updated equalization range 206. In this embodiment, the transmitter control logic is configured to process the locked initial static equalization range by selecting first a setting adjustment, and thereafter applying the selected setting adjustments randomly, uniformly, or by using Gaussian distribution.

In an embodiment, the setting selector and adjustor module 200 is configured to use pre-defined values or a look-up table to obtain a desired setting adjustment. The desired setting adjustment may be derived by adding or subtracting the selected pre-defined value such as 1 dB, 2 dB, etc. from the reference static equalization range. In this embodiment, the variation type selector 202 is configured to select the variation type and the setting adjustment may be applied using the selected variation type randomly, uniformly, or by using Gaussian distribution.

In an embodiment, the control signals 210 may include instructions to implement the updated equalization ranges in the lanes of the transmission channel. For example, in the x4 root port, the control signal may implement the same equalization range across four lanes of the x4 root port, or the control signal may implement different equalization ranges for each lane. In this example, the equalization value at any point in time within an equalization range on one lane is different from the equalization value at any point in time within a similar equalization range or different equalization range in another lane.

Figure 3:
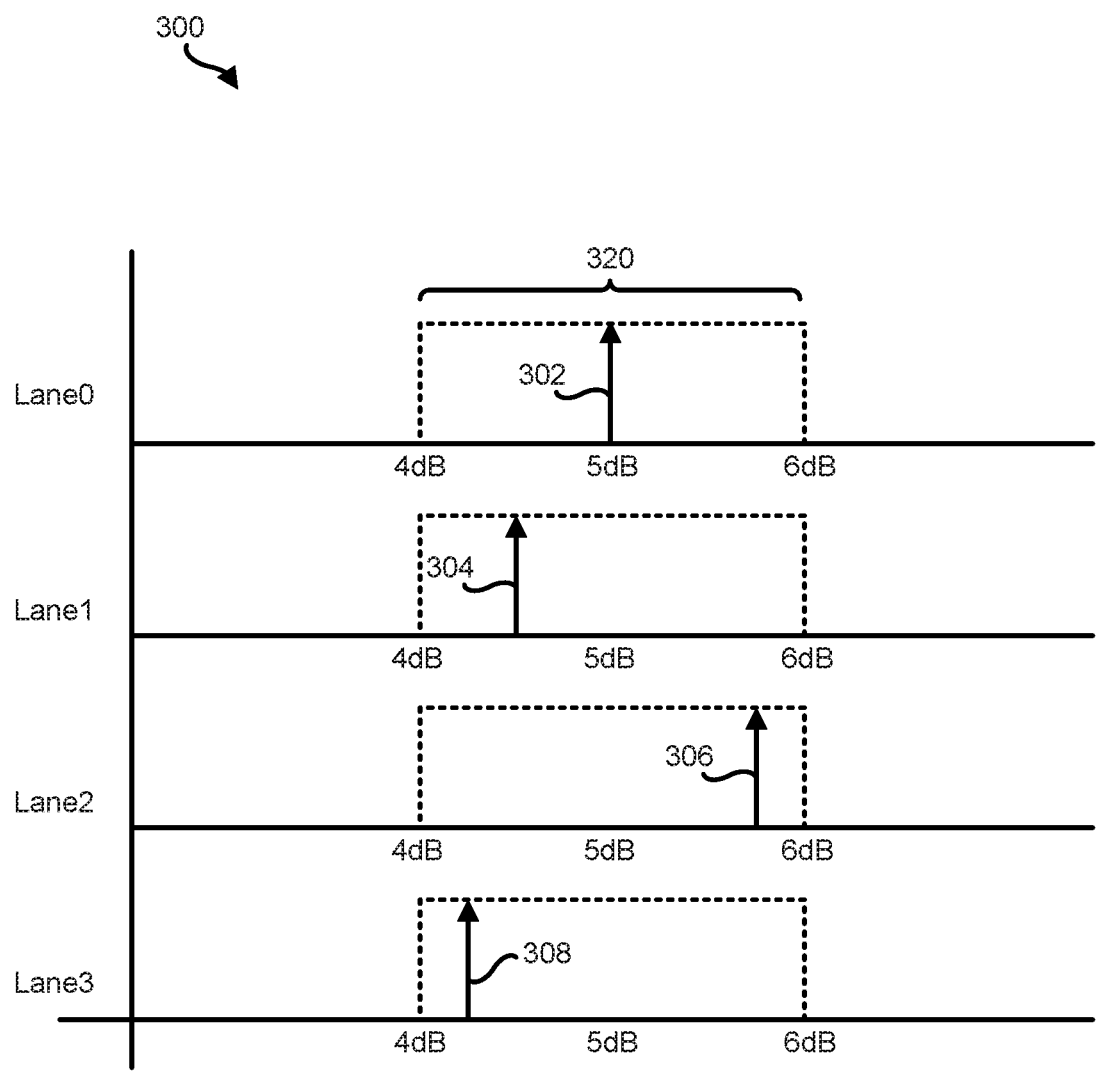
FIG. 3 is a graph showing an application of identical transmitter equalization ranges across all lanes of a transmission channel.

FIG. 3 shows a graph 300 of an updated transmitter equalization range that is identically applied in each lane of an x4 root port. The graph includes equalization values 302, 304, 306, and 308 for lanes 0, 1, 2, and 3, respectively, of the x4 root port. The equalization value may include the emphasis-equalization provided by the FFE CTLE at any point in time within an equalization range 320, which indicates the updated equalization range after the processing of the initial static equalization range as described in FIG. 2.

In an embodiment, the transmitter control logic may facilitate generation of non-aligned equalization values 302, 304, 306, and 308, at any point in time within the equalization range 320. For example, for a static reference equalization range of 5 dB, the setting selector and adjustor module 200 may select and apply +−1 dB to the initially locked 5 dB. In this example, the application of the selected +−1 dB value creates the 4 dB to 6 dB equalization range that may be applied across all lanes of the x4 root port. Because of the random, uniform, or Gaussian distribution that creates the time-varying frequency filter responses in the FFE CTLE module, the equalization values 302, 304, 306, and 308 are not aligned with one another. This non-alignment minimizes presence of crosstalk in the x4root port.

Figure 4:
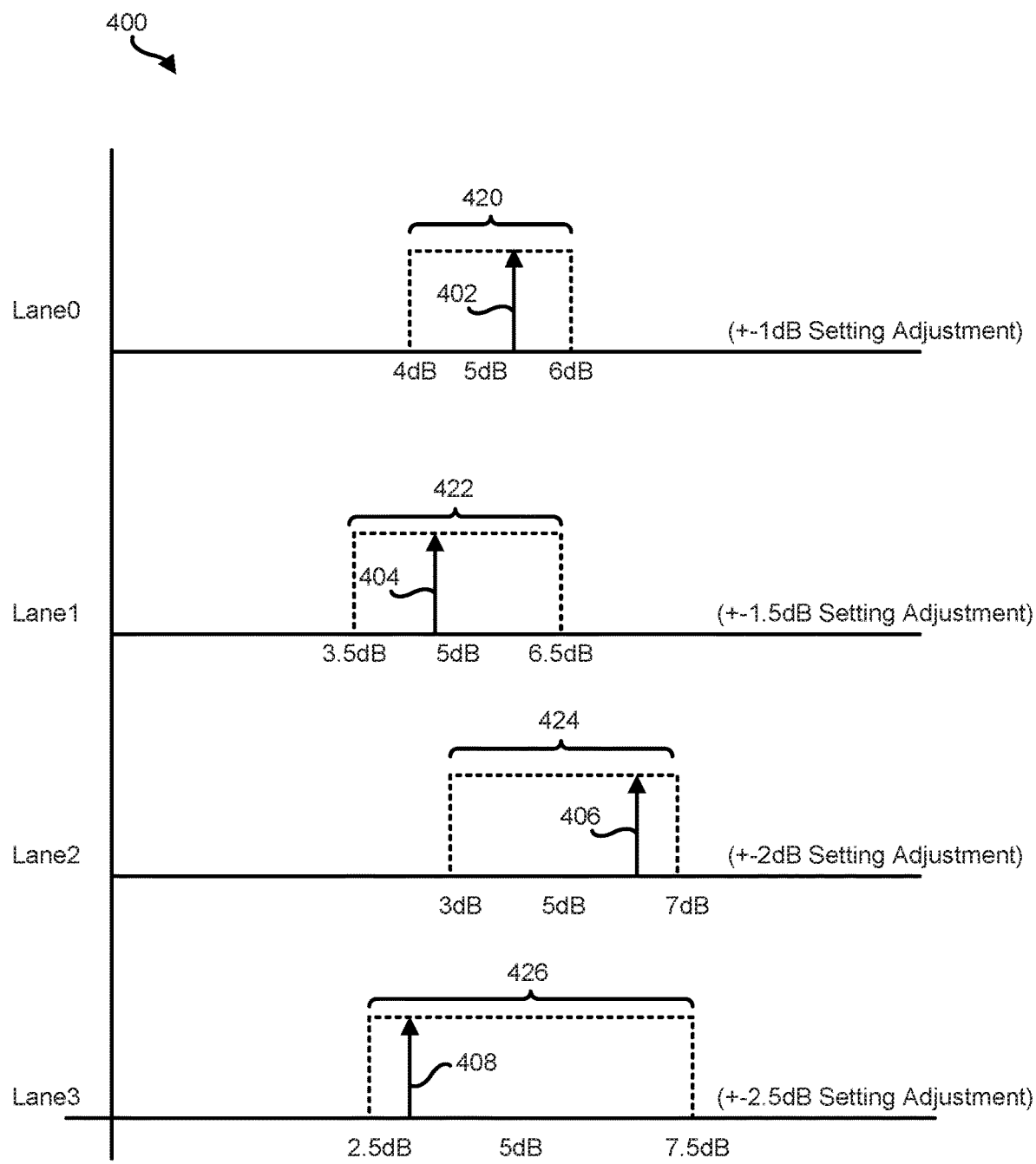
FIG. 4 is a graph showing an application of different transmitter equalization ranges between different lanes of a transmission channel.

FIG. 4 shows a graph 400 of different updated transmitter equalization ranges that are applied in a four-lane x4 root port. Graph 400 includes example equalization values 402, 404, 406, and 408 in lanes 0, 1, 2, and 3, respectively, of the x4 root port. The lanes 0, 1, 2, and 3 may further include equalization ranges 420, 422, 424, and 426, respectively. The varying equalization ranges are generated from an application of different setting adjustments on each lane of the x4 root port.

For example, for a static reference equalization value of 5 dB, the setting selector and adjustor component may select and apply +−1 dB, +−1.5 dB, +−2 dB, and +−2.5 dB pre-set values to the 5 dB. In this example, the resulting equalization ranges 420, 422, 424, and 426 may include 4 dB-5 dB, 3.5 dB-5.5 dB, 3 dB-7 dB, and 2.5 dB-7.5 dB ranges, respectively. In this example still, the different setting adjustments are applied randomly, uniformly, or by using Gaussian distribution.

In an embodiment, the transmitter control logic may facilitate the generation of non-aligned equalization values 402, 404, 406, and 408, at any point in time within the different equalization ranges 420, 422, 424, and 426. In this embodiment, the non-alignment of the different equalization values may minimize presence of crosstalk.

Figure 5:
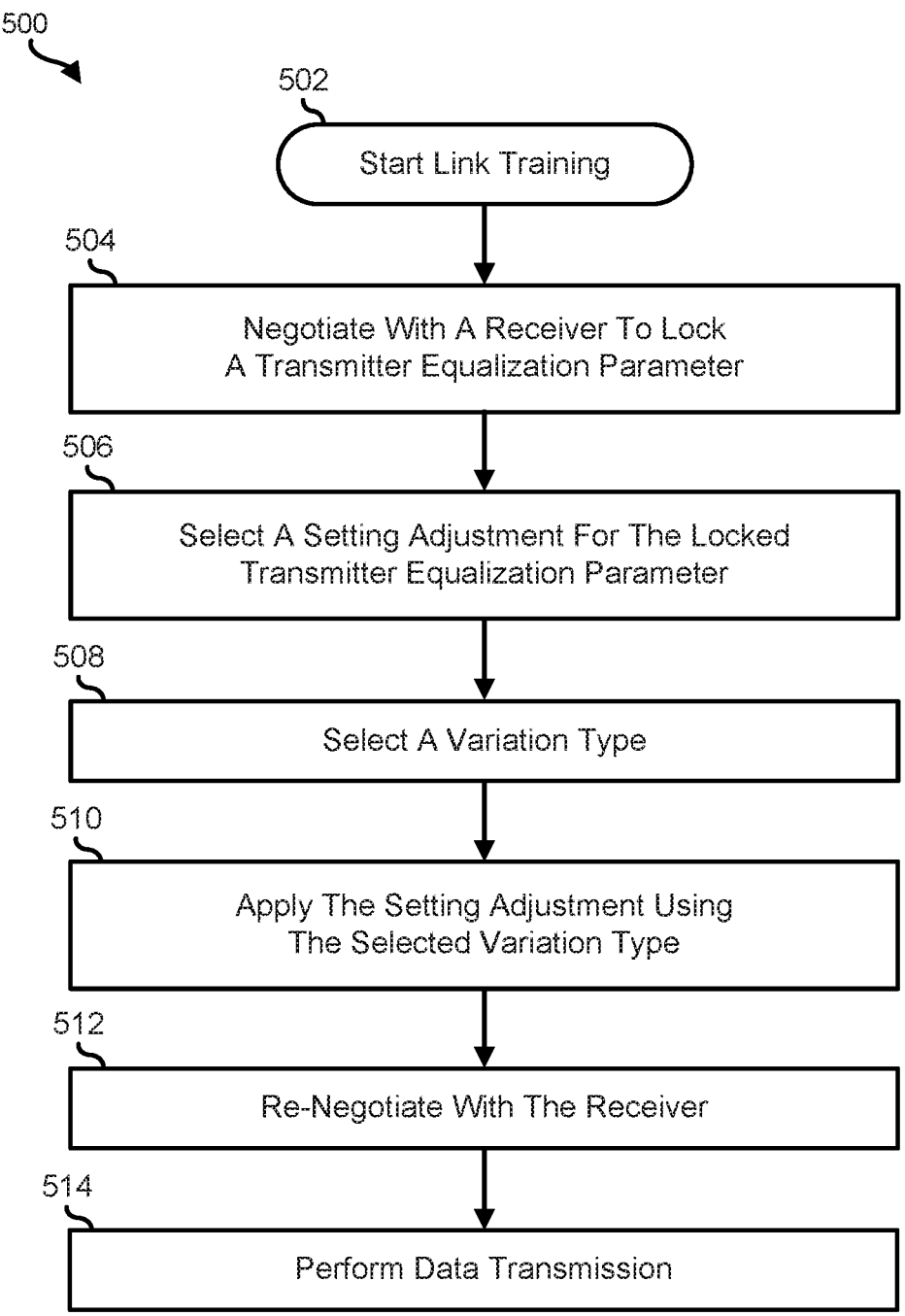
FIG. 5 is a flowchart illustrating a method of minimizing crosstalk by using variable equalization in a serial channel according to an embodiment of the present disclosure.

FIG. 5 shows a method 500 for using variable equalization to minimize crosstalk in a serial channel of a system according to an embodiment of the present disclosure. At block 502, link training is begun where a transmitter and receiver in the system perform a back channel adaption operation. At block 504, the transmitter channel management module negotiates and locks a static transmitter equalization parameter. At block 506, the transmitter control logic selects a setting adjustment for the static transmitter equalization parameter. At block 508, the transmitter control logic is configured to select a variation type. At block 510, the setting adjustment is implemented or applied using random variation, uniform variation, Gaussian method, or any other variation types. At block 512, the transmitter re-negotiates with the receiver with regard to the updated transmitter equalization parameters. At block 514, the receiver adapts the updated transmitter equalization parameters and accordingly adjusts its receiving parameters to receive transmitted data.

Figure 6:
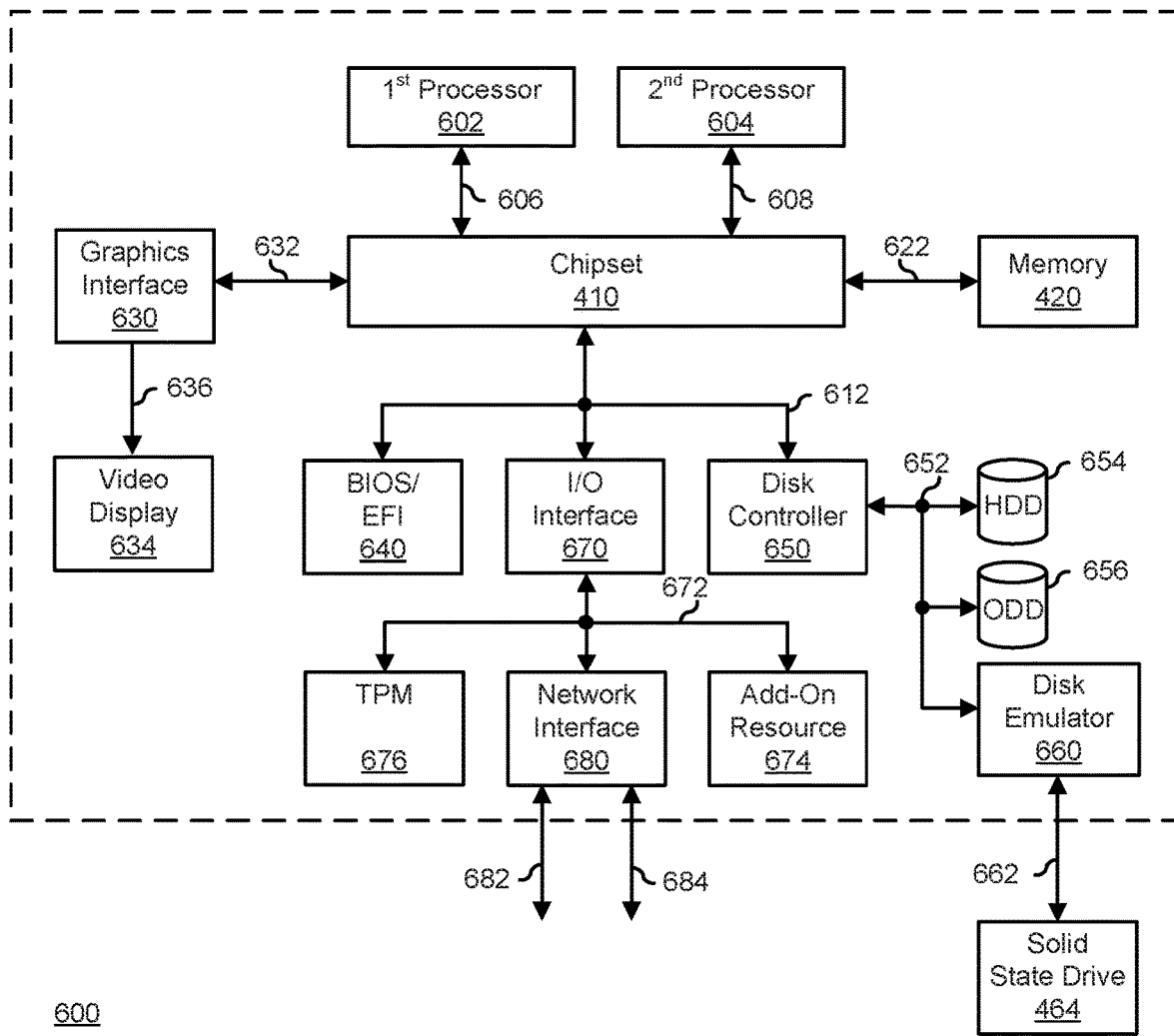
FIG. 6 is a block diagram illustrating a generalized information handling system according to an embodiment of the present disclosure.

FIG. 6 illustrates a generalized embodiment of information handling system 600. For purpose of this disclosure information handling system 600 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 600 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 600 can include processing resources for executing machine-executable code, such as a central processing unit (CPU), a programmable logic array (PLA), an embedded device such as a System-on-a-Chip (SoC), or other control logic hardware. Information handling system 600 can also include one or more computer-readable medium for storing machine-executable code, such as software or data. Additional components of information handling system 600 can include one or more storage devices that can store machine-executable code, one or more communications ports for communicating with external devices, and various input and output (I/O) devices, such as a keyboard, a mouse, and a video display. Information handling system 600 can also include one or more buses operable to transmit information between the various hardware components.

Information handling system 600 can include devices or modules that embody one or more of the devices or modules described above, and operates to perform one or more of the methods described above. For example, the transmitter 110 may be a part of a processor while the receiver 130 may be included in a disk controller. Information handling system 600 includes the processors 602 and 604, a chipset 610, a memory 620, a graphics interface 630, include a basic input and output system/extensible firmware interface (BIOS/EFI) module 640, a disk controller 650, a disk emulator 660, an input/output (I/O) interface 670, and a network interface 680. Processor 602 is connected to chipset 610 via processor interface 606, and processor 604 is connected to the chipset via processor interface 608. Memory 620 is connected to chipset 610 via a memory bus 622. Graphics interface 630 is connected to chipset 610 via a graphics interface 632, and provides a video display output 636 to a video display 634. In a particular embodiment, information handling system 600 includes separate memories that are dedicated to each of processors 602 and 604 via separate memory interfaces. An example of memory 620 includes random access memory (RAM) such as static RAM (SRAM), dynamic RAM (DRAM), non-volatile RAM (NV-RAM), or the like, read only memory (ROM), another type of memory, or a combination thereof.

BIOS/EFI module 640, disk controller 650, and I/O interface 670 are connected to chipset 610 via an I/O channel 612. An example of I/O channel 612 includes a PCI interface, a PCI-Extended (PCI-X) interface, a high-speed PCI-Express (PCIe) interface, another industry standard or proprietary communication interface, or a combination thereof. Chipset 610 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 640 includes BIOS/EFI code operable to detect resources within information handling system 600, to provide drivers for the resources, initialize the resources, and access the resources. BIOS/EFI module 640 includes code that operates to detect resources within information handling system 600, to provide drivers for the resources, to initialize the resources, and to access the resources.

Disk controller 650 includes a disk interface 652 that connects the disc controller to a hard disk drive (HDD) 654, to an optical disk drive (ODD) 656, and to disk emulator 660. An example of disk interface 652 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 660 permits a solid-state drive 664 to be connected to information handling system 600 via an external interface 662. An example of external interface 662 includes a USB interface, an IEEE 1394 (Firewire) interface, a proprietary interface, or a combination thereof. Alternatively, solid-state drive 664 can be disposed within information handling system 600.

I/O interface 670 includes a peripheral interface 672 that connects the I/O interface to an add-on resource 674, to a TPM 676, and to network interface 680. Peripheral interface 672 can be the same type of interface as I/O channel 612, or can be a different type of interface. As such, I/O interface 670 extends the capacity of I/O channel 612 when peripheral interface 672 and the I/O channel are of the same type, and the I/O interface translates information from a format suitable to the I/O channel to a format suitable to the peripheral channel 672 when they are of a different type. Add-on resource 674 can include a data storage system, an additional graphics interface, a network interface card (NIC), a sound/video processing card, another add-on resource, or a combination thereof. Add-on resource 674 can be on a main circuit board, on separate circuit board or add-in card disposed within information handling system 600, a device that is external to the information handling system, or a combination thereof.

Network interface 680 represents a NIC disposed within information handling system 600, on a main circuit board of the information handling system, integrated onto another component such as chipset 610, in another suitable location, or a combination thereof. Network interface device 680 includes network channels 682 and 684 that provide interfaces to devices that are external to information handling system 600. In a particular embodiment, network channels 682 and 684 are of a different type than peripheral channel 672 and network interface 680 translates information from a format suitable to the peripheral channel to a format suitable to external devices. An example of network channels 682 and 684 includes InfiniBand channels, Fibre Channel channels, Gigabit Ethernet channels, proprietary channel architectures, or a combination thereof. Network channels 682 and 684 can be connected to external network resources (not illustrated). The network resource can include another information handling system, a data storage system, another network, a grid management system, another suitable resource, or a combination thereof.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
negotiating, by a transmitter, with a receiver to lock a transmitter equalization parameter;
selecting a setting adjustment for the locked transmitter equalization parameter;
selecting a variation type;
applying the selected setting adjustment using the selected variation type, wherein the applying creates an updated transmitter equalization parameter;
re-negotiating the updated transmitter equalization parameter; and
performing data transmission.

2. The method of claim 1, wherein the locked transmitter equalization parameter includes a static equalization range.

3. The method of claim 2, wherein the selected setting adjustment includes a pre-defined value that is added and subtracted to the static equalization range to generate an updated equalization range.

4. The method of claim 3, wherein the updated equalization range is applied on each lane of a peripheral component interconnect express (PCIe) root port.

5. The method of claim 2, wherein the selected setting adjustment includes different amount of pre-set values, wherein each of the pre-set values is added to and subtracted from the static equalization range to generate different equalization ranges.

6. The method of claim 5, wherein each of the different equalization ranges is applied to a corresponding lane of a peripheral component interconnect express (PCIe) root port.

7. The method of claim 1, wherein the setting adjustment is selected from pre-defined values.

8. The method of claim 1, wherein the variation type includes a random, a uniform, or a Gaussian distribution.

9. The method of claim 1, wherein the applying of the selected setting adjustment using the selected variation type generates non-aligned equalization values.

10. An information handling system comprising:
a transmitter including:
a transmitter channel management module configured to negotiate and to lock a static transmitter equalization range; and
control logic configured to:
select a setting adjustment for the locked transmitter equalization range;
select a variation type;
apply the selected setting adjustment using the selected variation type, wherein the applying of the selected setting adjustment creates an updated transmitter equalization range;
instruct the transmitter channel management module to re-negotiate the updated transmitter equalization range; and
transmit data; and
a receiver configured negotiate and re-negotiate with the transmitter in order to receive the updated transmitter equalization range, wherein the receiver auto-adapts the updated transmitter equalization range to receive the transmitted data.

11. The information handling system of claim 10, wherein the selected setting adjustment includes a pre-defined value that is added and subtracted to the static equalization range to generate the updated equalization range.

12. The information handling system of claim 11, wherein the updated equalization range is applied on each lane of a peripheral component interconnect express (PCIe) root port.

13. The information handling system of claim 10, wherein the selected setting adjustment includes different amount of pre-set values, wherein each of the pre-set values is added to and subtracted from static equalization range to generate different equalization ranges.

14. The information handling system of claim 13, wherein each of the different equalization ranges is applied to a corresponding lane of a peripheral component interconnect express (PCIe) root port.

15. The information handling system of claim 10, wherein the variation type includes a random, a uniform, or a Gaussian distribution.

16. A method comprising:
receiving, by a transmitter, a static equalization range;
selecting a setting adjustment of the static equalization range;
selecting a variation type;
applying the selected setting adjustment using the selected variation type, wherein the applying creates an updated transmitter equalization range;
re-negotiating the updated transmitter equalization range; and
transmitting data.

17. The method of claim 16, wherein the selected setting adjustment includes a pre-defined value that is added or subtracted to the static equalization range to generate the updated equalization range.

18. The method of claim 17, wherein the updated equalization range is applied on each lane of a peripheral component interconnect express (PCIe).

19. The method of claim 16, wherein the selected setting adjustment includes different amount of pre-set values that are added and subtracted to the static equalization range to generate different equalization ranges.

20. The method of claim 19, wherein each of the different equalization ranges is applied to a corresponding lane of a peripheral component interconnect express (PCIe).

* * * * *